United States Patent
Diehl et al.

(10) Patent No.: US 7,225,500 B2
(45) Date of Patent: Jun. 5, 2007

(54) SENSOR APPARATUS AND SELF-PROPELLED FLOOR CLEANING APPLIANCE HAVING A SENSOR APPARATUS

(75) Inventors: Ralph Diehl, Baltmannsweiler (DE); Gottfried Benzler, Kirchberg (DE); Joachim Keppler, Winnenden (DE); Jakob Janzen, Backnang (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 227 days.

(21) Appl. No.: 11/030,012

(22) Filed: Jan. 4, 2005

(65) Prior Publication Data
US 2005/0172445 A1 Aug. 11, 2005

Related U.S. Application Data

(63) Continuation of application No. PCT/EP03/06223, filed on Jun. 13, 2003.

(30) Foreign Application Priority Data
Jul. 8, 2002 (DE) ................ 102 31 386

(51) Int. Cl.
*A47L 11/00* (2006.01)
(52) U.S. Cl. ............... 15/319; 180/169; 700/258
(58) Field of Classification Search .......... 180/169; 15/319; 700/258, 259; 701/23; 342/70; 343/717, 753; 398/153
See application file for complete search history.

(56) References Cited

U.S. PATENT DOCUMENTS

| | | | | |
|---|---|---|---|---|
| 4,280,580 A | * | 7/1981 | Wojcik .................. 180/169 |
| 4,580,311 A | | 4/1986 | Kurz | |
| 5,109,566 A | * | 5/1992 | Kobayashi et al. ........... 15/319 |
| 5,293,955 A | * | 3/1994 | Lee ............................. 180/169 |
| 5,341,540 A | * | 8/1994 | Soupert et al. .............. 15/319 |
| 6,157,320 A | * | 12/2000 | Yujiri et al. ................ 340/901 |
| 6,389,329 B1 | * | 5/2002 | Colens ....................... 700/262 |
| 6,493,612 B1 | * | 12/2002 | Bisset et al. ................. 701/23 |
| 6,553,612 B1 | * | 4/2003 | Dyson et al. .............. 15/340.1 |
| 6,711,280 B2 | * | 3/2004 | Stafsudd et al. ........... 382/106 |
| 6,732,826 B2 | * | 5/2004 | Song et al. ................ 180/169 |
| 6,814,171 B2 | * | 11/2004 | Polak ......................... 180/169 |

(Continued)

FOREIGN PATENT DOCUMENTS

DE 34 31 175 8/1985

(Continued)

*Primary Examiner*—Christopher Bottorff
(74) *Attorney, Agent, or Firm*—Lipsitz & McAllister, LLC

(57) ABSTRACT

The invention relates to a sensor apparatus for a self-propelled floor cleaning appliance for detecting a down step, having a transmission unit and a reception unit for infrared radiation and having evaluation electronics for evaluating the intensity of the radiation received. To develop the sensor apparatus in such a manner that a down step or a steep downslope of the floor surface can be determined more reliably, while the sensor apparatus can be produced at low cost, according to the invention it is proposed that the sensor apparatus has the reception unit and a first and a second transmission unit, the second transmission unit being disposed at a distance from a connecting straight line running through the reception unit and the first transmission unit. The invention also proposes a floor cleaning appliance having a sensor apparatus of this type.

12 Claims, 1 Drawing Sheet

U.S. PATENT DOCUMENTS

| | | | |
|---|---|---|---|
| 6,883,201 B2 * | 4/2005 | Jones et al. | 15/319 |
| 6,941,199 B1 * | 9/2005 | Bottomley et al. | 701/23 |
| 7,079,923 B2 * | 7/2006 | Abramson et al. | 700/245 |
| 2002/0016649 A1 * | 2/2002 | Jones | |

FOREIGN PATENT DOCUMENTS

| | | |
|---|---|---|
| DE | 691 20 176 | 3/1992 |
| DE | 93 07 500 | 7/1993 |
| DE | 101 13 105 | 10/2001 |
| EP | 0 474 542 | 3/1992 |
| WO | 93/03399 | 2/1993 |

* cited by examiner

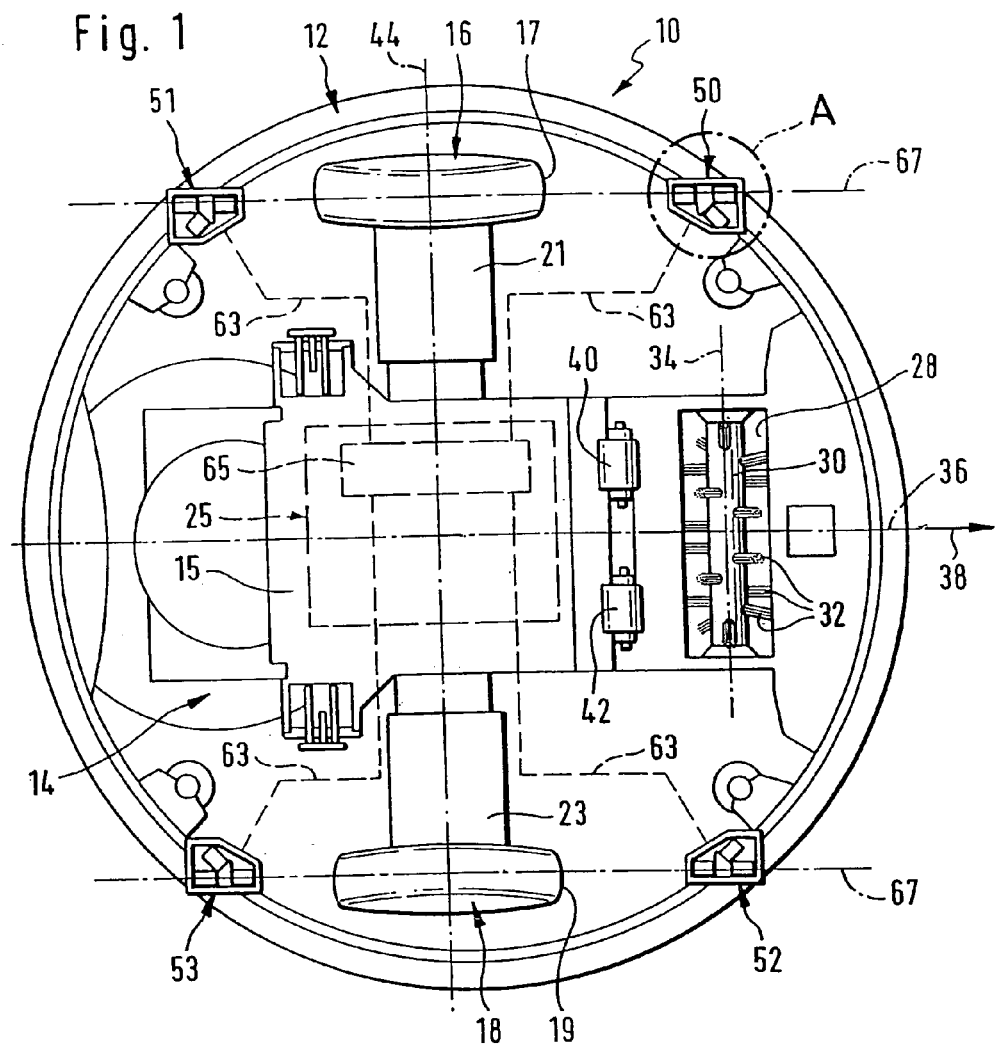

SENSOR APPARATUS AND SELF-PROPELLED FLOOR CLEANING APPLIANCE HAVING A SENSOR APPARATUS

This application is a continuation of international application number PCT/EP 03/06223 filed on Jun. 13, 2003.

The present disclosure relates to the subject matter disclosed in international application number PCT/EP 03/06223 of Jun. 13, 2003 and German application number 102 31 386.5 of Jul. 8, 2002, which are incorporated herein by reference in their entirety and for all purposes.

BACKGROUND OF THE INVENTION

The invention relates to a sensor apparatus for a self-propelled floor cleaning appliance for detecting a down step with a transmission unit for emitting infrared radiation and a reception unit for receiving infrared radiation and with evaluation electronics for evaluating the intensity of the radiation received.

Moreover, the invention relates to a self-propelled and self-steering floor cleaning appliance having a chassis and an electrical drive unit with electrical control unit and drive wheels mounted on the chassis, and with a sensor apparatus of this type.

A floor surface can be cleaned with the aid of self-propelled and self-steering floor cleaning appliances without the need for an operator. The floor cleaning appliance is in this case moved along the floor surface that is to be cleaned. If it encounters an obstacle, it changes its direction of movement in accordance with a predeterminable control program. To detect a steep downslope on the floor surface or also a step, the floor cleaning appliance is equipped with a sensor apparatus which detects the floor surface that is to be cleaned by means of infrared radiation and forms a proximity sensor which provides an electrical control signal for the control electronics. If the detected distance exceeds a predetermined maximum permissible distance, the floor cleaning appliance likewise executes a change in the direction of movement. To check the distance, the sensor apparatus has a transmission unit which directs infrared radiation onto the floor surface. The infrared radiation which is reflected from the floor surface is received by the reception unit, and the intensity of the reflected radiation is evaluated by the evaluation electronics.

Sensor apparatuses of this type have the difficulty that the intensity of the reflected infrared radiation is dependent not only on the distance between the sensor apparatus and the floor surface, but also on the direction of the radiation reflected from the floor surface. If the floor surface has regions with a reflection surface oriented obliquely with respect to the sensor apparatus, for example in the form of cables or beveled edge regions of floor tiles, the infrared radiation emitted is reflected in a direction away from the reception unit, so that a signal of weak intensity is received even when the true distance is only relatively short.

It has already been proposed to use a position-dependent reception unit, in which case it is not the intensity of the reflected radiation that is evaluated, but rather the point of impingement of the infrared radiation on the reception unit. This point of impingement is dependent on the distance between the sensor apparatus and the floor surface that is to be cleaned. However, position-dependent sensor apparatuses of this type are characterized by considerable production difficulties and are therefore associated with by no means insignificant production costs.

It is an object of the present invention to develop a sensor apparatus and a floor cleaning appliance of the type described in the introduction in such a manner that a down step or a steep downslope in the floor surface can be detected more reliably, and the sensor apparatus can be produced at low cost.

SUMMARY OF THE INVENTION

In a sensor apparatus of the generic type, this object is achieved, according to the invention, by the fact that the sensor apparatus has a reception unit and a first and a second transmission unit, the second transmission unit being disposed at a distance from a connecting straight line running through the reception unit and the first transmission unit.

According to the invention, two transmission units are used, with the aid of which infrared radiation can be directed onto the floor surface that is to be cleaned, and the infrared radiation which is in each case reflected is received by the common reception unit and converted into an electrical signal which is fed to the evaluation electronics, which evaluates the intensity of the infrared radiation reflected. The radiation emitted by the second transmission unit and reflected from the floor surface impinges on the reception unit at a different angle from the radiation emitted by the first transmission unit and reflected by the floor surface. For this purpose, the second transmission unit is disposed at a distance from a connecting straight line which is defined by the reception unit and the first transmission unit. It has been found that by using this type of arrangement of two transmission units and one common reception unit, it is possible to reliably detect a down step or a steep downslope in the floor surface by evaluating the intensity of the reflected radiation. This allows a reliable conclusion to be drawn as to whether the distance between the sensor apparatus and the floor surface is within a tolerable distance range, so that the floor cleaning appliance can move onward in the same direction of travel, or is outside this tolerance range, in which case there is a risk of the floor cleaning appliance falling, so that it is necessary for the floor cleaning appliance to change its direction of travel, even in regions with cables running on the floor and/or surface portions oriented obliquely with respect to the vertical, in the form of beveled edge regions of floor tiles.

To achieve a configuration of the sensor apparatus which is compact and simple to handle in particular for assembly purposes, it is expedient if the reception unit and the first and second transmission units are integrated in a housing of the sensor apparatus.

It is particularly advantageous if the first and second transmission units focus the infrared radiation which is emitted in each case into a common focal point. It has been found that with an orientation of the infrared radiation of this nature, it is possible to draw a particularly reliable conclusion as to whether the distance between the sensor apparatus and the floor surface exceeds a predeterminable maximum value such that there is a risk of the floor cleaning appliance falling.

A preferred embodiment is distinguished by the fact that the second transmission unit is disposed between the reception unit and the first transmission unit, with respect to the connecting straight line. As a result, the sensor apparatus acquires a particularly compact configuration. In this context, it is particularly advantageous if the distance between the reception unit and the first transmission unit is greater than the distance between the second transmission unit and the connecting straight line.

An embodiment of the sensor apparatus according to the invention which can be produced at particularly low cost is distinguished by the fact that the first and second transmission units each have an infrared radiation source and an optical element for beam guidance, in particular for focusing the emitted radiation, the radiation sources being oriented parallel to one another. An embodiment of this type is distinguished by simple assembly of the sensor apparatus.

It is advantageous if the reception unit comprises an element which is sensitive to infrared radiation and has associated with it an optical element for beam guidance. The beam guidance element may in this case be configured as a diverting and/or focusing element which diverts the reflection radiation impinging on the beam guidance element toward the radiation-sensitive element and focuses it onto the element.

It is preferable for optical elements for background masking to be associated with the reception unit. This makes it possible to block out background rays and therefore facilitates evaluation of the received signal. The elements for background masking may be integrated in the elements for beam guidance.

Preferably, the reception unit and the first and second transmission units are disposed at a distance from one another, with an optical separating element which is opaque to radiation in each case being disposed between the reception unit and the first transmission unit and between the reception unit and the second transmission unit. Separating elements of this type make it possible to ensure that infrared radiation which is emitted by the transmission units cannot impinge directly on the reception unit, but rather must firstly be reflected from the floor surface that is to be cleaned.

A structurally particularly simple embodiment is distinguished by the fact that the two separating elements form a single-piece partition made from a material which is opaque to infrared radiation. The partition may in this case be formed integrally on the housing of the sensor apparatus. It is particularly advantageous if the partition forms a support for the reception unit and for the first and second transmission units. This enhances the mechanical stability of the sensor apparatus.

As was mentioned in the introduction, the invention also relates to a self-propelled and self-steering floor cleaning appliance having a chassis and having an electrical drive unit which comprises electrical control electronics and drive wheels mounted on the chassis. To develop the floor cleaning appliance in such a manner that the risk of it falling can be reliably detected, according to the invention it is proposed that the floor cleaning appliance comprises a sensor apparatus of the type described above, which is coupled to the control electronics, the infrared radiation which is emitted being directed onto the floor surface that is to be cleaned.

As has already been mentioned, by using the sensor apparatus, which can be produced at low cost, it is possible to reliably detect the risk of the appliance falling, i.e. the evaluation electronics can check whether the distance between the sensor apparatus and the floor surface that is to be cleaned exceeds a permissible maximum value.

The floor cleaning appliance preferably has two drive wheels, a sensor apparatus being disposed in front of and behind each drive wheel, based on a main direction of movement of the floor cleaning appliance. This makes it possible to reliably detect the risk of the floor cleaning appliance falling both when it is moving forward and when it is moving backward.

To ensure that the risk of the floor cleaning appliance falling can be detected not only when the front of the appliance is approaching a change in height, but also when the change in height is being approached at an acute angle, in a particularly preferred embodiment of the floor cleaning appliance according to the invention it is proposed that the front and rear sensor apparatuses which are respectively associated with a drive wheel are oriented with their respective connecting straight lines aligned with one another.

It is particularly advantageous if the front and rear sensor apparatuses, respectively associated with a drive wheel, are oriented with their respective connecting straight lines aligned with the tread of the drive wheel.

The floor cleaning appliance preferably comprises at least one supporting roller which is disposed between the front sensor apparatuses and the drive wheels, based on a main direction of movement of the floor cleaning appliance. In this context, it is particularly expedient if the distance between the supporting rollers and the front sensor apparatuses, as seen in the main direction of movement, corresponds to at least a quarter of the distance between the front sensor apparatuses and the drive wheels. This makes it possible to ensure that the floor cleaning appliance can be stopped in good time when the floor cleaning appliance is approaching a down step before the supporting roller, which is positioned in front of the drive wheels in the direction of movement, moves beyond the edge of the step.

The following description of a preferred embodiment of the invention, in conjunction with the drawing, serves to provide a more detailed explanation.

BRIEF DESCRIPTION OF THE DRAWINGS

FIG. 1: shows a diagrammatic view of a floor cleaning appliance according to the invention from below; and FIG. 2: shows an enlarged illustration of region A from FIG. 1 with a sensor apparatus according to the invention.

DETAILED DESCRIPTION OF THE INVENTION

FIG. 1 diagrammatically depicts a view of a self-propelled and self-steering floor cleaning appliance, which is denoted overall by reference numeral 10, from below. The floor cleaning appliance comprises a housing 12, which forms a chassis 14, onto the top side of which a housing cover (not shown in the drawing) can be fitted. Two drive wheels 16, 18, which each have a tread 17 and 19, respectively, by means of which the drive wheels 16, 18 are in contact with a floor surface that is to be cleaned, are rotatably mounted on the chassis 14.

The drive wheels 16, 18 each have an associated electric drive motor 21 and 23, respectively, which is fixed to the underside of the chassis 14. The two drive motors 16, 18 are electrically connected to control electronics 25, positioned on the top side of the chassis 14, and to a rechargeable battery, which is known per se and is therefore not shown in the drawing.

On its top side, the chassis 14 carries a suction unit, which is known per se and therefore not illustrated in the drawing and which is in flow communication in conventional manner, via a suction passage, with a dirt inlet opening 28 disposed at a base plate 15, a dirt collection vessel (not shown) being disposed in conventional manner between the dirt inlet opening 28 and the suction unit.

A brush roller 30 is rotatably mounted in the region of the dirt inlet opening 28. The brush roller 30 comprises radially protruding sweeping brushes 32 which pass through the dirt inlet opening 28 and with the aid of which dirt can be picked up from a floor surface that is to be cleaned and can be thrown through the dirt inlet opening 28 into the suction duct. The axis of rotation 34 of the brush roller 30 is oriented perpendicular to a longitudinal axis 36 of the floor cleaning appliance 10 and is positioned at a distance in front of the drive wheels 16 and 18, based on a main direction of movement, symbolized by the arrow 38, of the floor cleaning appliance.

Two supporting rollers 40, 42, the axis of rotation of which is oriented parallel to the axis of rotation 34 of the brush roller 30 and parallel to the common axis of rotation 44 of the drive wheels 16 and 18, are freely rotatably mounted on the base plate 15, behind the dirt inlet opening 28, based on the main direction of movement 38, and mirror-symmetrically with respect to the longitudinal axis 36.

The floor cleaning appliance 10 can be moved forward in the main direction of movement 38 and backward in the opposite direction to this direction 38 by means of the drive wheels 16 and 18 and the supporting rollers 40, 42. In this way, dirt can be sucked up from the floor surface that is to be cleaned under the action of the suction flow generated by the suction unit, with the brush roller 30 additionally being used to pick up dirt. Actuation of one of the two drive motors 21 or 23 on one side allows the floor cleaning appliance 10 to be turned.

If the floor cleaning appliance 10 approaches a down step or some other form of steep downslope in the floor surface that is to be cleaned, a step or downslope of this type is detected by the floor cleaning appliance 10, which then changes its direction of movement in order to prevent the floor cleaning appliance from falling. For this purpose, a total of four sensor apparatuses 50, 51, 52, 53 are mounted on the underside of the housing 12, the sensor apparatuses 50 and 51 being associated with the drive wheel 16 and the sensor apparatus 50 being disposed in front of the drive wheel 16 and the sensor apparatus 51 behind the drive wheel 16, based on the main direction of movement 38. The sensor apparatuses 52 and 53 are associated with the drive wheel 18 in a corresponding way, with the sensor apparatus 52 being positioned in front of the drive wheel 18 and the sensor apparatus 53 behind the drive wheel 18, based on the main direction of movement 38. The distance between the housing 12 and the floor surface that is to be cleaned can be recorded contactlessly by means of the sensor apparatuses 50 to 53. If the distance exceeds a predetermined maximum value, the floor cleaning appliance 10 stops in order then to continue its movement in the opposite direction.

The sensor apparatuses 50 to 53 are of identical configuration. Consequently, the following text will provide a more detailed description only of the sensor apparatus 50, which is diagrammatically depicted in FIG. 2. It comprises a sensor housing 55, which surrounds a first transmission unit 57 and a second transmission unit 59, with the aid of which in each case focused infrared radiation can be directed obliquely with respect to the vertical onto the floor surface that is to be cleaned, and also a common reception unit 61 for receiving infrared radiation reflected from the floor surface and for providing an intensity-dependent electrical signal.

In each sensor apparatus 50 to 53, the respective reception unit 61 is connected via a signal line 63 to evaluation electronics 65 which are integrated in the control electronics 25 and evaluate the electrical signals provided in accordance with the intensity of the infrared radiation received in a manner which is conventional and therefore not explained in more detail in the present context, and provide an alarm signal to the control electronics 25 in the event of a maximum distance between housing 12 and floor surface that is to be cleaned being exceeded, so that the movement of the floor cleaning appliance is stopped and then continued in the opposite direction of travel. The reception unit 61, in combination with the first transmission unit 57, defines a connecting straight line 67, and the second transmission unit 59 is disposed at a distance from the connecting straight line 67 and between the reception unit 61 and the first transmission unit 57 with respect to the connecting straight line 67.

The first transmission unit 57 and the second transmission unit 59 are identical in configuration and each comprise an infrared radiation source in the form of a diode 69 which emits infrared light and an optical focusing element 71 for focusing the infrared radiation emitted by the light-emitting diode 69. The focused radiation from the light-emitting diodes 69 of the two transmission units 57 and 59 is bundled in a common focal point.

The reception unit 61 has an element which is sensitive to infrared light, in the form of a phototransistor 73, which likewise has an optical focusing element 75 connected upstream of it, which diverts the infrared radiation impinging on the reception unit 61 in the direction of the phototransistor 73 and focuses it onto the phototransistor 73.

A housing insert 77 made from a material which is opaque with respect to infrared radiation is disposed between the reception unit 61 and the first and second transmission units 57 and 59, respectively. The housing insert 77 in this case forms a mechanical support for the transmission and reception units 57, 59 and 61 and comprises a housing wall 78 which is of single-piece configuration and against which the reception unit 61 and the first transmission unit 57 and the second transmission unit 59 rest really, and which, moreover, ensures that infrared radiation emitted by the transmission units 57 and 59 cannot reach the reception unit 61 directly.

Since the second transmission unit 59 is disposed obliquely with respect to the connecting straight line 67, the beams emitted by the transmission units 57 and 59 and reflected from the floor surface impinge on the reception unit 61 at different angles. It has been found that using an orientation of this nature ensures that cables running on the floor surface or obliquely oriented reflection surfaces, for example beveled edge regions of floor tiles, have no adverse effect on the checking of the risk of the floor cleaning appliance falling.

As is clear from FIG. 1, the sensor apparatuses 50, 51 and 52, 53 which are respectively associated with a drive wheel 16 and 18 are oriented with their connecting straight lines 67 aligned with one another and aligned with the respective tread 17 or 19 of the associated drive wheels 16 or 18, respectively. The front sensor apparatuses 50 and 52, based on the main direction of movement 38, are disposed at the level of the axis of rotation 34 of the brush roller 30, based on the longitudinal axis 36, so that the supporting rollers 40 and 42 are positioned between the front sensor apparatuses 50 and 52 and the drive wheels 16, 18, based on the longitudinal axis 36. The distance between the supporting rollers 40, 42 and the front sensor apparatuses 50, 52, based on the longitudinal axis 36, is in this case approximately one third of the distance between the common axis of rotation 44 of the drive wheels 16 and 18 and the front sensor apparatuses 50 and 52.

If the floor cleaning appliance 10 is displaced in the main direction of movement 38, the front sensor apparatuses 50 and 52, in combination with the evaluation electronics 65, detect that a maximum distance between the housing 12 and the floor surface that is to be cleaned has been exceeded if a down step is reached. The result of this is that the movement of the floor cleaning appliance 10 is stopped even before the supporting rollers 40 and 42 reach the step that has been detected by the sensor apparatuses 50 and 52. Then, the direction of movement of the floor cleaning appliance 10 is reversed, so that the floor cleaning appliance 10 moves away from the step again. If a step or steep downslope in the floor surface is detected by only one of the sensor apparatuses 50, 51, 52, 53, the floor cleaning appliance 10 executes a turning movement in the direction away from the step.

The invention claimed is:

1. Sensor apparatus for enabling a self-propelled floor cleaning appliance to detect a down step, comprising:

first and second transmission units and a reception unit for infrared radiation; and evaluation electronics for evaluating an intensity of radiation received by the reception unit from the transmission units, wherein:

the second transmission unit is disposed at a distance from a connecting straight line running through the reception unit and the first transmission unit, and the first and second transmission units focus the infrared radiation into a common focal point.

2. Sensor apparatus according to claim 1, wherein the sensor apparatus has a housing which accommodates the reception unit and the first and second transmission units.

3. Sensor apparatus according to claim 1, wherein the second transmission unit is disposed between the reception unit and the first transmission unit, with respect to the connecting straight line.

4. Sensor apparatus according to claim 1, wherein the first and second transmission units each have an infrared radiation source and an optical element for guiding the beam of radiation emitted, the radiation sources being oriented parallel to one another.

5. Sensor apparatus according to claim 1, wherein the reception unit comprises an element which is sensitive to infrared radiation and has associated with it an optical element for beam guidance.

6. Sensor apparatus according to claim 1, wherein the reception unit and the first and second transmission units are disposed at a distance from one another, with an optical separating element which is opaque to radiation in each case being disposed between the reception unit and the first transmission unit and between the reception unit and the second transmission unit.

7. Sensor apparatus according to claim 6, wherein the separating elements form a single-piece partition made from a material which is opaque to infrared radiation.

8. Sensor apparatus, for enabling a self-propelled floor cleaning appliance to detect a down step, comprising:

first and second transmission units and a reception unit for infrared radiation; and evaluation electronics for evaluating an intensity of radiation received by the reception unit from the transmission units, wherein:

the second transmission unit is disposed at a distance from a connecting straight line running through the reception unit and the first transmission unit, and an optical element for blocking out background radiation is associated with the reception unit.

9. Self-propelled and self-steering floor cleaning appliance having a chassis and an electrical drive unit with electrical control electronics and drive wheels mounted on the chassis, wherein:

the floor cleaning appliance comprises a sensor apparatus according to claim 1, which is coupled to the control electronics, and infrared radiation which is emitted from the transmission units of the sensor apparatus is directed onto the a floor surface that is to be cleaned.

10. Self-propelled and self-steering floor cleaning appliance having a chassis and an electrical drive unit with electrical control electronics and two drive wheels mounted on the chassis, wherein the floor cleaning appliance comprises a sensor apparatus being disposed in front of and behind each drive wheel, based on a main direction of movement of the floor cleaning appliance, and coupled to the control electronics for enabling the appliance to detect a down step, the sensor apparatus comprising:

first and second transmission units and a reception unit for infrared radiation; and evaluation electronics for evaluating an intensity of radiation received by the reception unit from the transmission units, the second transmission unit being disposed at a distance from a connecting straight line running through the reception unit and the first transmission unit, wherein infrared radiation which is emitted from the transmission units is directed onto a floor surface that is to be cleaned.

11. Floor cleaning appliance according to claim 10, wherein the front and rear sensor apparatuses which are respectively associated with a drive wheel are oriented with their respective connecting straight lines aligned with one another.

12. Floor cleaning appliance according to claim 10, wherein the front and rear sensor apparatuses which are respectively associated with a drive wheel are oriented aligned with the tread of the drive wheel.

* * * * *

UNITED STATES PATENT AND TRADEMARK OFFICE
CERTIFICATE OF CORRECTION

PATENT NO. : 7,225,500 B2 Page 1 of 1
APPLICATION NO. : 11/030012
DATED : June 5, 2007
INVENTOR(S) : Diehl et al.

It is certified that error appears in the above-identified patent and that said Letters Patent is hereby corrected as shown below:

Column 8, line 20: after the word "onto" delete the word "the".

Signed and Sealed this

Sixth Day of November, 2007

JON W. DUDAS
*Director of the United States Patent and Trademark Office*